March 5, 1935.                J. C. BRIAN                1,993,644
                            WEIGHING MACHINE
                  Filed July 25, 1932         5 Sheets-Sheet 1

J. C. Brian INVENTOR

By: Marks & Clerk Att'ys.

March 5, 1935.  J. C. BRIAN  1,993,644
WEIGHING MACHINE
Filed July 25, 1932   5 Sheets-Sheet 2

J. C. Brian
INVENTOR
By Marks & Clerk
ATTYS.

March 5, 1935. J. C. BRIAN 1,993,644
WEIGHING MACHINE
Filed July 25, 1932 5 Sheets-Sheet 3
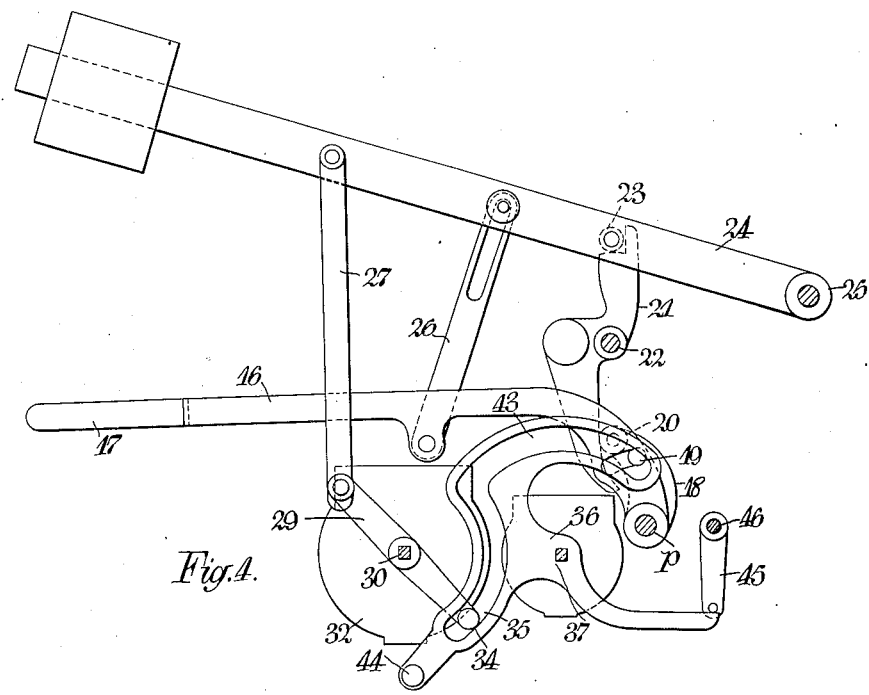
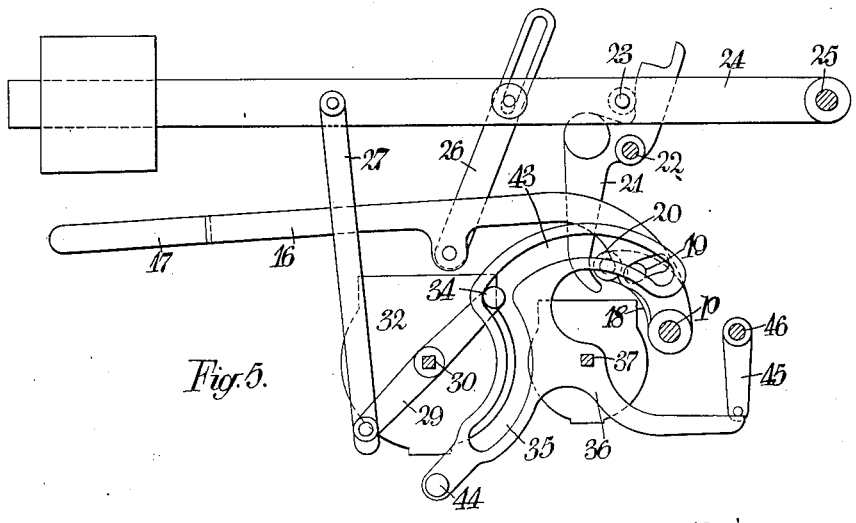
J. C. Brian
INVENTOR March 5, 1935. J. C. BRIAN 1,993,644

WEIGHING MACHINE

Filed July 25, 1932 5 Sheets-Sheet 4

J. C. Brian
INVENTOR

By Marks & Clerk
ATTys

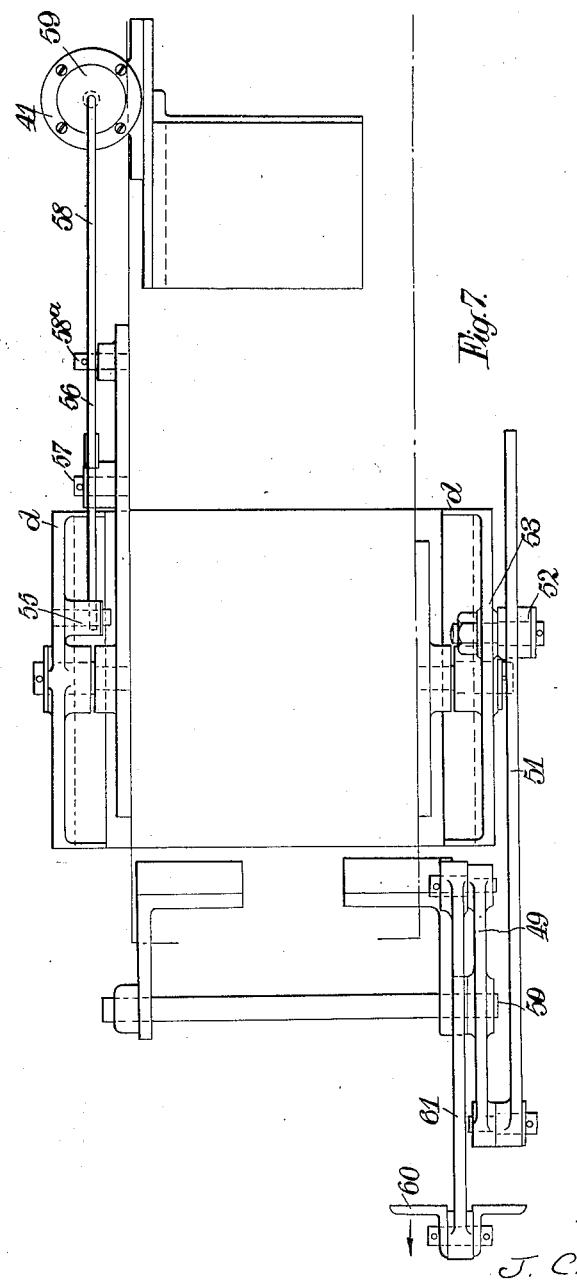

Patented Mar. 5, 1935

1,993,644

UNITED STATES PATENT OFFICE 1,993,644

WEIGHING MACHINE

John Charles Brian, Cheadle Heath, near Manchester, England, assignor to Henry Simon Limited, Cheadle Heath, near Manchester, England, a British company Application July 25, 1932, Serial No. 624,571
In Great Britain October 29, 1931

4 Claims. (Cl. 249—48)

This invention relates to weighing machines for the bulk weighing of material, such as grain, and having main and dribble feeds by which the material reaches the weigh hopper. The invention is concerned with such weighing machines of the type in which there are provided means for initially counterbalancing the final part of the weighing which passes into the weigh hopper through the dribble feed, and means for compensating for the material in transit between the dribble feed gate and the material in the weigh hopper when the total weighing is practically complete.

Hitherto the counterbalancing and compensating means have been in operation simultaneously and the weighbeam has moved away first from the counterbalancing device, and then from the compensating device in order to effect the final weighing. Generally a stop has been provided to prevent the counterbalancing device from following the weighbeam.

The present invention comprises, in weighing machines of the aforesaid type, the provision of means which bring the counterbalancing and compensating devices into operation successively and which withdraw the counterbalancing device from the steelyard or equivalent part of the weighing machine or a part interconnected therewith (hereinafter termed steelyard), to enable the latter to return to its initial position before the compensating device comes into operation.

The invention further comprises the provision of means which withdraw the compensating device from the steelyard to enable the balancing of the latter for the final weighing to be observed.

The invention further comprises the provision of power operated means for controlling the feed hopper main sluice and dribble valves, the main valve when closed automatically opening the dribble valve, the shutting of the main valve being effected under the control of the counter-balancing device and the shutting of the dribble valve being controlled by the compensating device.

The invention further comprises the improved combinations and arrangements of parts hereinafter described and claimed.

Referring to the accompanying sheets of explanatory drawings:—

Figure 4 shows the remainder of the weighing machine control mechanism in position ready for weighing, corresponding to Figure 2.

Figure 5 shows the mechanism of Figure 4 after a predetermined proportion of the material being weighed has been delivered into the weigh hopper, corresponding to Figure 3.

Figure 7 is a plan view of the parts shown in Figure 6.

The same reference letters in the different views indicate the same parts.

In the views and in the following description only so much of the mechanism of the complete weighing machine is depicted and described as is necessary to make clear the present invention. The weigh hopper and the methods of applying its weight to a steelyard, the valves which control the admission of grain to it and the release of grain therefrom are of well known type and form no part of my invention.

Figure 1:
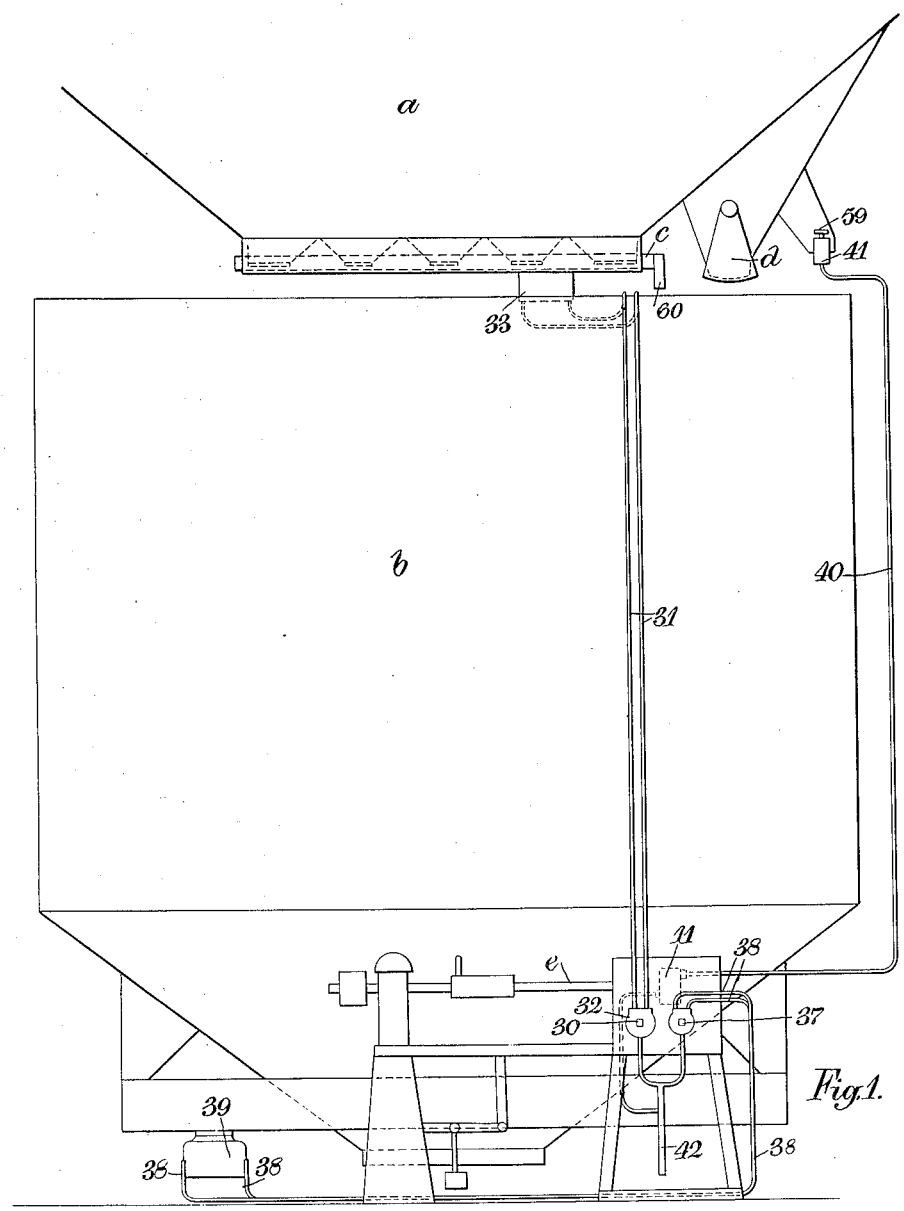
Figure 1 is a general view of a weighing machine for grain weighing with my improvements applied thereto.

In Figure 1, the feed hopper $a$ from which grain is fed to the weigh hopper $b$ has a main sluice valve at $c$ of the grid or gate type and a dribble valve at $d$, the main valve giving a rapid feed of material into the weigh hopper $b$ and the dribble valve a slow rate of feed. The weigh hopper $b$ is carried by a system of levers in the known manner, the weight of which is ultimately applied to the steelyard $e$ also in any well known manner.

The end of the steelyard $e$ is adapted to be engaged at its underside by two levers $f$ and $g$ (see Figures 2 and 3) which I will call the counterbalancing lever ($f$), and the compensating lever ($g$) respectively. The amount of upward pressure applied to the steelyard by the levers $f$ and $g$ can be adjusted by moving the weights $h$ and $i$ respectively along the levers.

Above the end of the steelyard $e$ is arranged a trip lever $j$ pivoted at $k$ and carrying an upwardly projecting stem $m$ with a roller $n$ at its upper end supporting the end of the falling arm $o$ pivoted at $p$, and carrying below its pivot a part $q$ which can when the falling arm turns about its pivot raise the end of the counterbalancing lever $f$ and move the latter clear of the steelyard e. A further part r of the falling arm o below its pivot acts to bear upon a lever s, pivoted at t and adapted normally to rest in the Figure 3 position. The part r holds the lever in the position shown in Figure 2 so that the compensating lever g is prevented from applying upward pressure to the steelyard e.

Figure 2:
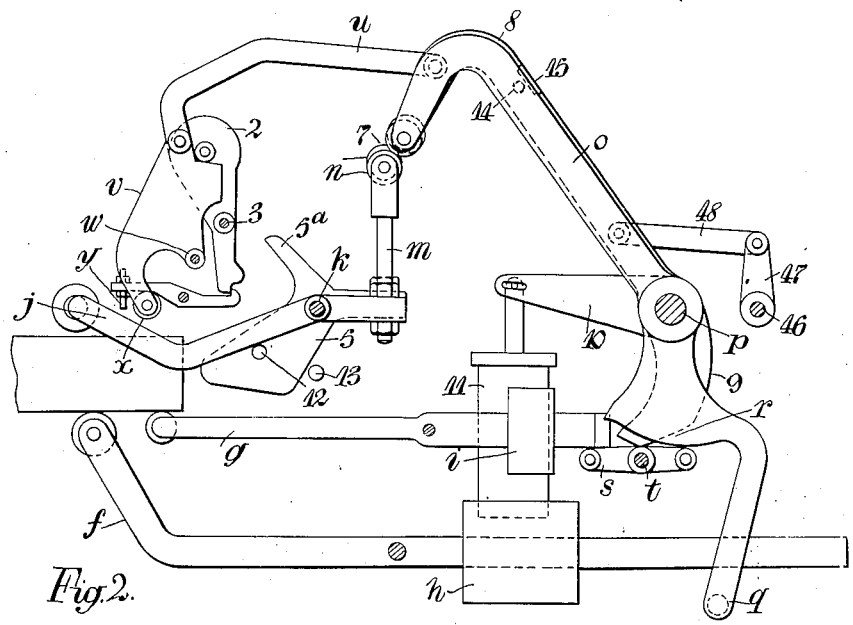
Figure 2 is a view of part of the mechanism by which the steelyard controls the feeding of material to the weighing machine, the mechanism being shown in position ready for weighing.
Figure 3:
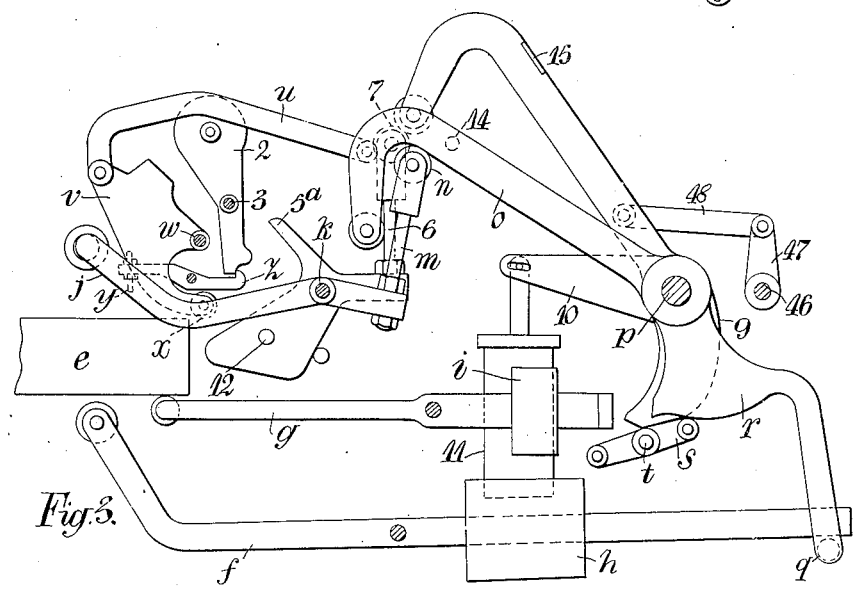
Figure 3 is a view similar to Figure 2 but showing the mechanism after a predetermined proportion of the material being weighed has been delivered into the weigh hopper.

Attached to the falling arm o by the rod u is a member v pivoted at w which has a roller x at its lower end to prevent the steelyard e from engaging the end y of the trip lever z, and which also serves as a safety catch for holding the weighted lever 2 (which is pivoted at 3) in the position indicated in Figure 2.

A member 5 is carried by the fulcrum pin k of the trip lever j and upon 5 is mounted a stem 6 having a roller 7 thereon at its upper end to support a second falling arm 8 mounted freely upon the fulcrum p of the arm o, and having a part 9 thereon which when the arm 8 falls engages the lever s and moves the compensating lever g out of engagement with the steelyard e. The arm 10 turns with the falling arm 8 and operates a piston type compressed air control valve in the cylinder 11.

This valve and also other air-control valves about to be mentioned are of well-known construction per se.

A stop 12 on the member 5 limits the downward movement of the trip lever j and a stop 13 limits the downward movement of the member 5.

A pin 14 on the falling arm o engages a projection 15 upon the falling arm 8 when the arm o is raised so that the two arms are lifted together.

The fulcrum p turns with the arm o and on referring to Figure 4 it will be seen that this fulcrum shaft p has secured thereon a long arm 16 with a handle grip 17 at its outer end. There is an arm 18 free upon the shaft p and connected to the arm 16 by a pin 19 and slot connection. A roller 20 upon the arm 18 is adapted to engage the lower end of a locking catch 21 pivoted at 22 which when it comes beneath a roller 23 on the lever 24 pivoted at 25 holds such lever in an elevated position as shown in Figure 4. The normal position of the catch 21 is shown in Figure 4. Its displaced position is shown in Figure 5. The arm 24 is connected by the slotted link 26 to the handle 16. It is also connected by a link 27 with a lever 29 which turns the spindle 30 of a valve controlling the flow of compressed air to a piston which moves the main sluice feed valve c of the feed hopper a.

The compressed air supply pipe 31 from the valve fitting 32 to the cylinder 33 containing the piston which operates the valve c are shown in Figure 1.

The roller 34 upon the lever 29 moves in a curved slot 35 in a member 36 which is secured upon a spindle 37 of a control valve for the compressed air which actuates the delivery valve of the weigh hopper b (Figure 1). The compressed air supply pipes 38 of the cylinder 39 containing the piston which actuates the delivery valve (of any known form) of the feed hopper are shown in Figure 1. The piston valve 11 controls the supply of compressed air by a pipe 40 to a cylinder 41 containing a piston which releases a catch holding the dribble valve open as hereinafter described. The main compressed air supply pipe is indicated at 42.

The member 36 has a second slot 43 therein concentric with the spindle 37 and the roller 34 can move in such slot when the member 36 is turned by hand by the handle 44. A catch arm 45 upon a spindle 46 (see also Figures 2 and 3) is operated by the falling arm 8 to which it is connected by the arm 47 and link 48.

Figure 6:
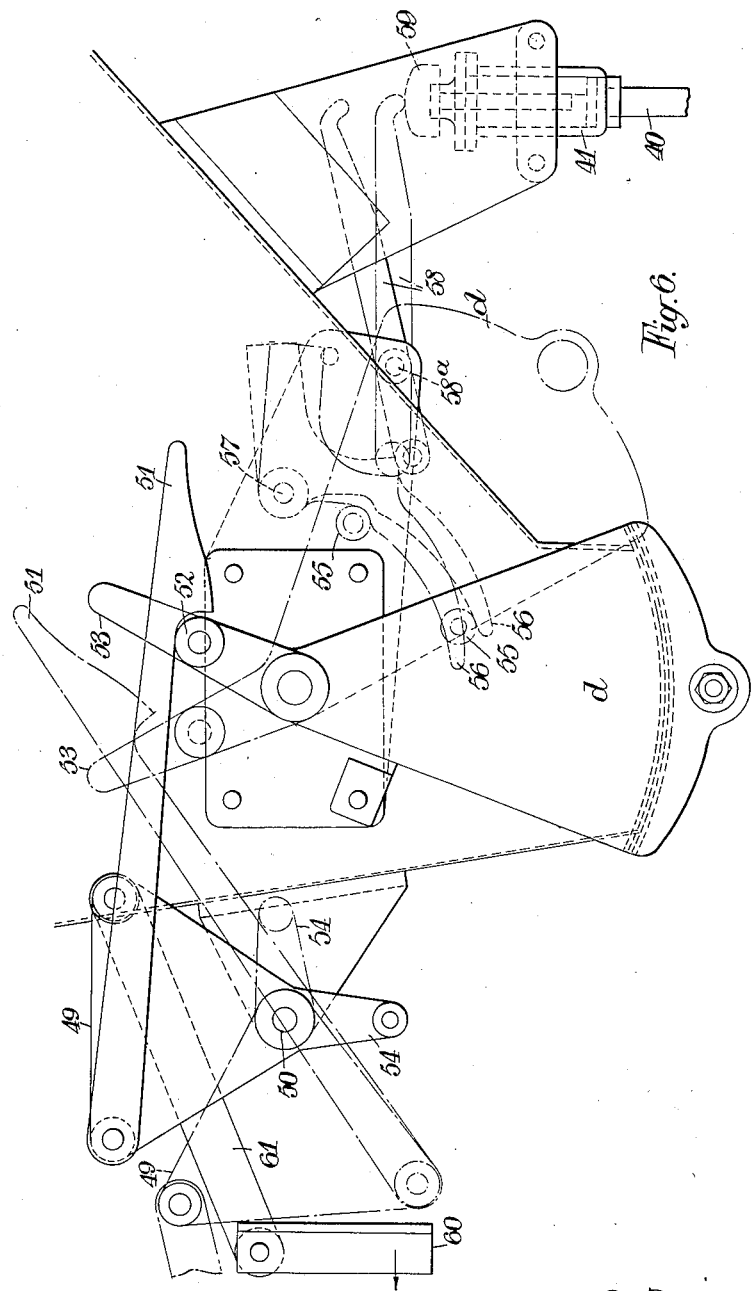
Figure 6 is a view of the mechanism by which the dribble valve of the feed hopper is opened when the main sluice valve of such hopper is closed.

The main sluice feed valve c has thereon a part 60 which is connected by a link 61 with a member 49 pivoted at 50 (see Figure 6). Such member 49 has a catch 51 pivoted thereto and adapted to engage a pin 52 upon an arm 53 upon the dribble valve d. An arm 54 upon the member 49 serves to raise the catch 51 clear of the pin 52 when the catch 51 has moved to the limit of its traverse to the left in Figure 6. This is the dotted or chain line position.

There is a pin 55 upon the dribble valve which engages a catch 56 pivoted at 57. A locking lever 58 pivoted at 58ª holds the catch 56 in its service position with the pin 55 held in a detent in the catch. The locking lever 58 is released by a plunger head 59 upon a piston in the cylinder 41 (see also Figure 1). When the plunger head 59 rises, the operative end of the locking lever falls, and the weight of the dribble valve d ensures the pin 55 moving out of the detent in the catch 56 so that the dribble valve can close.

The member 36 cannot be turned in a counter clockwise direction by the handle 44 from the position shown in Figures 4 and 5, whilst the catch 45 is in engagement therewith. As such catch is released only when the falling arm 8 is released by the roller 7 on the stem 6, it follows that the arm 36 can only be turned when the weighing is complete. When turned it operates the valve which supplies compressed air to the cylinder 39 to open the delivery valve of the weigh hopper b.

The operation of the machine is as follows: The parts are first set in the positions shown in Figures 2 and 4 by raising the handle 17 on the lever 16 which raises the lever 24. The latter is held raised by the automatic catch 21.

The lever 24 turns the lever 29 to cause compressed air from the valve fitting 32 to open the main sluice valve c of the feed hopper. The dribble valve d is closed. The delivery valve of the weigh hopper b is also closed. The spindle p on which the lever 16 is secured, raises the falling arm o and with it (due to the pin 14 and projection 15) the falling arm 8. This results due to the weight disposition of the remaining parts shown in Figure 2 in the said parts being brought to the Figure 2 position with the counterbalancing lever f operative to counterbalance a part of the weight of the steelyard.

If I assume that I am going to weight 30 tons of grain, and that the counterbalancing lever exerts an upward force upon the steelyard equal to a 5 ton weighing, then before the steelyard is raised by the grain in the weigh hopper b, 25 tons will have to be delivered into such hopper. When 25 tons have been delivered into the hopper b, the end of the steelyard e rises and engages the trip lever j which removes the roller n upon the stem m from beneath the falling arm o so that the latter can fall by its own weight to the Figure 3 position. In doing so it moves the member v to the Figure 3 position and so makes the weighted lever 2 free to move when released by the trip lever z. The falling arm also through the roller q moves the counter-balancing lever f clear of the steelyard and through the withdrawal of the part r allows the lever s to free the compensating lever g so that it can exert upward pressure upon the steelyard e. In addition, the falling arm o acting through the spindle p causes the parts shown in Figure 4 to be turned to the Figure 5 positions. The lever 16 is lowered; the arm 18 removes the catch 21 from beneath the roller 23 upon the lever 24 which therefore falls and turns the valve in the fitting 32 so as to pass compressed air to the cylinder 33 (Figure 1) and close the main sluice valve c of the feed hopper a. The part 60 on such valve c acting through the mechanism shown in Figure 6 now opens the dribble valve d so that grain passes from the feed hopper a to the weigh hopper b at a slow rate. The dribble gate is held open by the catch 56 and locking lever 58. The curved slot 35 in the member 36 allows the lever 29 to move from the Figure 4 to the Figure 5 position without movement of the member 36.

The compensating lever is weighted so as to counterbalance the steelyard to an extent represented by the weight of grain actually in transit between the dribble valve d and the weigh hopper b. The dribble valve continues to deliver grain until the weight of grain in the weigh hopper plus the weight in transit between the dribble valve and weigh hopper represents the complete weighing. The steelyard e now moves upwards and engages the stop y upon the catch lever z so releasing the weighted lever 2. The weighted end of the latter falls and the other end strikes the part 5ª of the member 5 which lowers the stem 6 and roller 7. The falling arm 8 now falls and through the arm 10 operates the valve 11 to cause compressed air to pass to the cylinder 41 and raise the plunger head 59 to move the locking lever 58 out of its service position when the catch 56 will allow the dribble valve to fall and cut off the dribble feed. At the same time the falling arm 8 through the parts 48, 47, 46 and 45 releases the member 36 so that it can be turned by hand to open the valve on the spindle 37 in order to open the weigh hopper delivery valve when delivery is to be made. The part 9 on the falling arm 8 engages the lever s and the latter puts the compensating lever g clear of the steelyard. The latter is now free and the operator can observe the balance to see that the weighing is correct. If correct, the operator turns the member 36 to cause the opening of the weigh hopper delivery valve. When delivery is completed, the member 36 is turned to the Figure 5 position and the handle 17 raised, when all the parts return to the Figures 2 and 4 positions.

It will be seen that the machine is set in its weighing position by the movement of a single hand lever 16 after the weigh hopper delivery valve has been closed, all the further operations until weighing is completed taking place automatically due to the movements of the steelyard e under the influence first of the counterbalance lever f and then of the compensating lever g, the two levers being put out of action successively when they have performed their functions so as to leave the steelyard free for finally balancing the weighing.

With my improvement, the operation of weighing is considerably simplified and the necessity for highly skilled service in bringing the weighing gradually to the desired amount as at present, obviated.

I may vary the details of the interlocking tripping and valve operating mechanisms to suit requirements.

In the appended claims, the term "steelyard" is used in the sense hereinbefore defined, namely, as indicating a steelyard or its equivalent, such as a weighbeam, or a part interconnected either directly or indirectly through levers or the like with the steelyard or its equivalents so that it moves with the latter during weighing.

What I claim is:—

1. The combination in weighing machines, of a weigh hopper, feed means providing for main and dribble feeds to said weigh hopper, a steelyard to which the weight of said weigh hopper is applied, a counterbalancing device acting upon said steelyard until the main fed part of the material to be weighed has been delivered to said weigh hopper to counterbalance the dribble fed part of the weighing, a compensating device for the dribble fed material in transit when the total weighing is practically complete, and means to bring the said counterbalancing and compensating devices into operation successively and to withdraw said counterbalancing device from said steelyard to enable the latter to return to its initial position before said compensating device comes into operation.

2. The combination with weighing machines as claimed in claim 1, of means to withdraw the compensating device from the steelyard to enable the balancing of the latter for the final weighing to be observed.

3. The combination in weighing machines of a weigh hopper, main and dribble feed valves by which the first and final parts respectively of the material to be weighed pass to said weigh hopper, a steelyard to which the weight of said weigh hopper is applied, a counterbalancing device acting upon said steelyard until said first part of the material to be weighed has been delivered to said weigh hopper to counterbalance said final part of the weighing, a compensating device for the material in transit between said dribble feed valve and said weigh hopper when the total weighing is practically complete, power operated means for controlling said main and dribble feed valves, means to bring said counterbalancing and compensating devices into operation successively and to withdraw said counterbalancing device from said steelyard to enable the latter to return to its initial position before said compensating device comes into operation, means to withdraw said compensating device from said steelyard to enable the balancing of the latter for the final weighing to be observed, means to shut said main feed valve when said counterbalancing device is withdrawn from said steelyard, the main feed valve when closed automatically opening said dribble feed valve, and means to shut said dribble feed valve when said compensating device is withdrawn from said steelyard.

4. The combination in weighing machines of a weigh hopper, main and dribble feed valves by which the first and final parts respectively of a total amount of material to be weighed pass to said weigh hopper, a steelyard to which the weight of said weigh hopper is applied, a counterbalancing device acting upon said steelyard until said first part of the material to be weighed has been delivered to said weigh hopper to counterbalance said final part of the weighing, a compensating device for the material in transit between said dribble feed valve and said weigh hopper when the total weighing is practically complete, means to bring said counterbalancing and compensating devices into operation successively and to withdraw said counterbalancing device from said steelyard to enable the latter to return to its initial position before said compensating device comes into operation, means to withdraw said compensating device from said steelyard to enable the balancing of the latter for the final weighing to be observed, means to shut said main feed valve when said counterbalancing device is withdrawn from said steelyard, means to shut said dribble feed valve when said compensating device is withdrawn from said steelyard, mechanism between said main feed and dribble feed valves to open the latter when the former is closed, a member controlling the delivery of material from said weigh hopper, trip mechanism disposed above said steelyard, a trip lever associated with said counterbalancing lever and also disposed above said stelyard, and weighted means operated by said trip lever when engaged by said steelyard to withdraw said counterbalancing lever from said steelyard, close said main feed valve, release said compensating lever to enable it to operate upon said steelyard, and render said trip mechanism operative when engaged by said steelyard to close said dribble feed valve, withdraw said lever from said steelyard, and operate said member to effect delivery from said weigh hopper.

JOHN CHARLES BRIAN.